W. W. ELMER.
Manufacture of Salt.
No. 235,143. Patented Dec. 7, 1880.
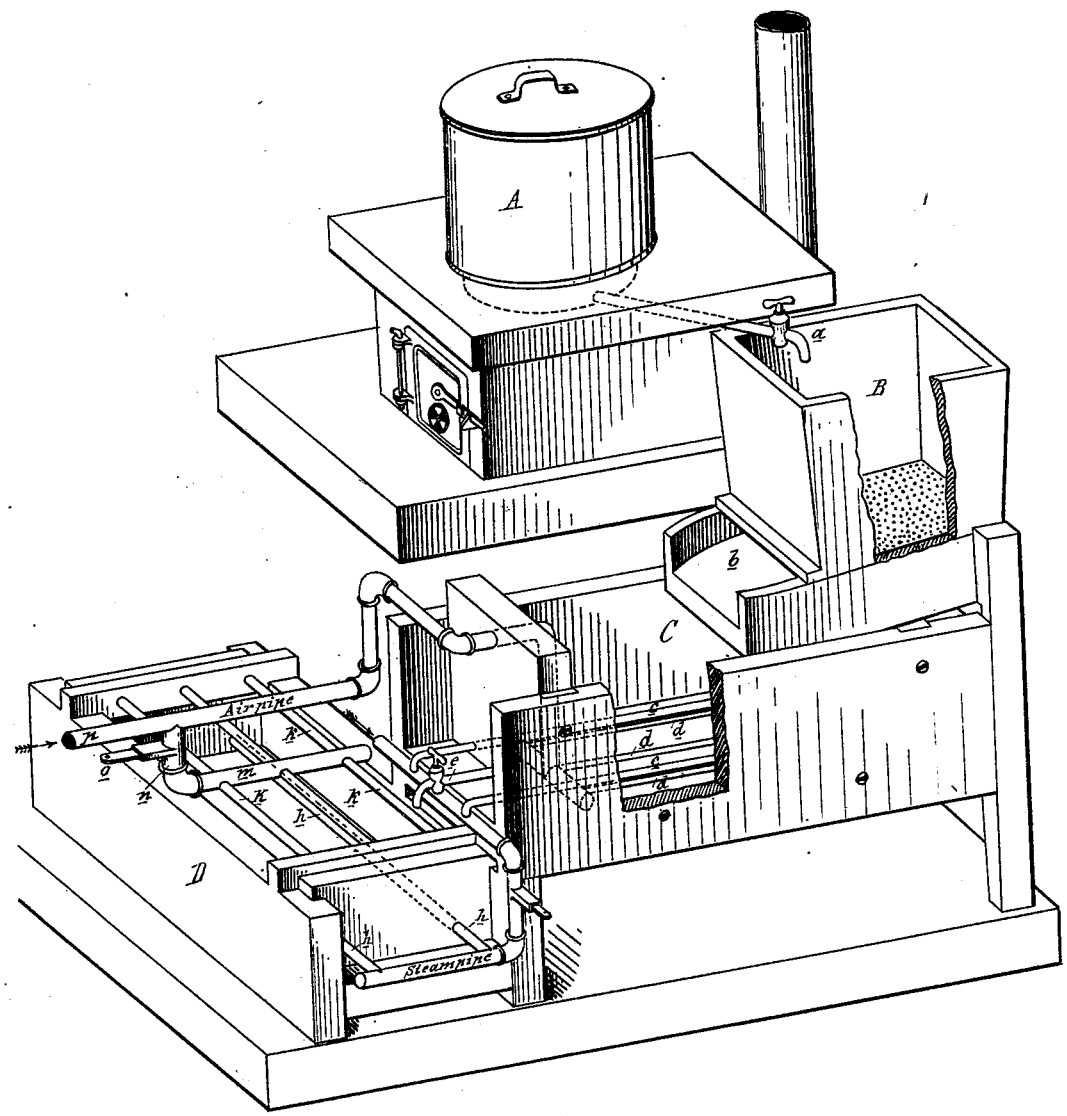

UNITED STATES PATENT OFFICE.

WILLIAM W. ELMER, OF BAY CITY, MICHIGAN.

MANUFACTURE OF SALT.

SPECIFICATION forming part of Letters Patent No. 235,143, dated December 7, 1880.

Application filed November 11, 1879.

*To all whom it may concern:*

Be it known that I, WILLIAM W. ELMER, M. D., of Bay City, in the county of Bay and State of Michigan, have invented an Improvement in the Manufacture of Salt, of which the following is a specification.

The nature of my invention relates to a new and improved process of manufacturing salt, and the necessary apparatus for successfully putting such process into operation.

The process is especially adapted for reclaiming and purifying the "trash" salt which accumulates about packing-houses and the manufacture of pure salt from the brine which has been employed for the preservation of meats, fish, &c. There are hundreds of tons of salt annually lost for want of a process and apparatus for reclaiming and purifying such salt as I have above described at a small expense.

The invention therefore consists in the process and in the apparatus for reclaiming and purifying such salt, as more fully hereinafter described.

I dissolve trash or impure salt in fresh water, or take waste brine from meats or manufactories, and boil such brine so made or obtained in a closed boiler a sufficient length of time to coagulate such albumen or other impurities as may be acted upon by heat, skimming off such impurities as may rise to the surface, or passing the brine through a strainer to remove them. The liquor is then passed through a suitable filter filled with sand or other suitable material. From the filter the brine is conveyed to a settler constructed in the usual manner, and adapted to be heated by close steam or otherwise, where the brine remains until it has reached the saturation-point. This settler is also provided with iron pipes with open ends terminating within the settler, through which air, heated or of the temperature of the surrounding media, is forced into the brine. The air thus forced into the brine has a twofold object, the first, being to act mechanically in distributing a strong solution of carbonate of soda through the brine, and, secondly, for its own specific action upon the impurities of the brine. The air thus applied through submerged pipes has a very decided action in depositing the several impurities in brine, making the resulting crystals comparatively pure. The solution of carbonate of soda is put into the settler, and thoroughly distributed by the action of the air discharged through the submerged perforated air-pipes before the brine reaches the point of saturation.

In purifying brine with carbonate of soda and an air-blast the action induced is somewhat complex. The impurities contained in the brine are usually chloride of calcium, iron, the sulphates of lime and magnesium, and other impurities, and before giving a description of the chemical action of the reagents I may further state that no proportion of the carbonate of soda to produce the best results of removing the impurities from the brine can be arbitrarily given, as no two brines are alike in the amount of impurities contained in them, so that the proportion of carbonate of soda to be used with a brine must, in some degree, be determined by the observation of an experienced salt-boiler. The action of the carbonate of soda on the chloride of calcium causes a double decomposition, both salts being decomposed. The freed chlorine unites with the soda, producing chloride of sodium, (common salt,) and the carbonate of lime is also formed. There is an excess of carbonate of soda present, a part of which is used in precipitating the protosalts of iron present in the brine after the iron has been changed to peroxide by the air-blast. In this chemical change oxygen is required, and I obtain it from the air-blast. The air-blast thus produces a mechanical effect in disseminating the carbonate of soda through the brine, and furnishes oxygen to produce the chemical action, as above described. After the brine has reached this point it is drawn into the grainer, constructed in the usual way and adapted to be heated by close steam, when the process is completed by the evaporation of the brine and the formation of the crystals.

In order to form the crystals of uniform size, the grainer is provided with a system of perforated air-pipes, through which air, heated or otherwise, is intermittently discharged into or upon the surface of the brine, as described in Letters Patent issued to me, bearing date the 22d day of July, 1879, and numbered 217,684.

In the accompanying drawings, which form a part of this specification, A represents the boiler; $a$, the pipe leading from the boiler to the filter. B is the filter, provided with a perforated bottom covered with fabric of any suitable character, and is filled with sand or other suitable material. $b$ is a spout leading from the filter to the settler C, which is provided with closed steam-pipes $c$, and with open air-pipes $d$, both sets of pipes being submerged in brine when in operation. The steam-pipes are connected with any suitable source of supply of steam, and the air-pipes with an air-pump, such source of steam supply and air-pump not being shown.

$e$ is a pipe leading from the settler to the grainer D, which is also provided with submerged steam-pipes $h$, and with perforated pipes $k$, by means of which air is intermittently discharged upon the surface of the brine, as described in said Letters Patent. To avoid unnecessary expense, these perforated pipes $k$ are connected with a main pipe, $m$, provided with a riser-pipe, $n$, in which is inserted a valve, $o$. This riser-pipe connects at top with the pipe $p$, the rear end of which is connected with the pipes $d$ in the settler, while its front end is attached to a suitable air-pump. (Not shown.) By this means but one air-pump will be required.

In the above description I have described the process and apparatus of manufacturing salt from brine which has been made from salt for packing purposes, and which has been employed for that purpose, and for remanufacturing trash or impure salt; but the process will be found equally beneficial in manufacturing salt from natural brine, except that the boiler and filter need not be used; but the process should commence in the settler, as described.

I am aware that carbonate of soda has been largely employed in the manufacture of salt after the latter has been crystallized, for the purpose of decomposing or neutralizing certain impurities in the form of earthy chlorides found in such salt; but I am not aware that such carbonate has been employed as I have described.

What I claim as my invention, and desire to secure by Letters Patent, is—

1. The process herein described of purifying brine, consisting in first introducing into the brine a solution of carbonate of soda before it reaches the point of saturation, and then subjecting the brine containing the solution of carbonate of soda to the mechanical and chemical action of currents of air, substantially as described, and for the purpose set forth.

2. The process herein described of purifying brine, consisting in first boiling the brine and filtering and settling it, and then purifying it by means of a solution of carbonate of soda introduced into it before it reaches the point of saturation, then subjecting the brine containing the solution of carbonate of soda to the action of currents of air forced into it, and finally in evaporating said brine, as specified.

3. The apparatus herein described for manufacturing salt, consisting of the boiler A, having pipe $a$, filter B, settler C, provided with submerged closed steam-pipes $c$, open air-pipes $d$, submerged in the brine, and pipe $e$, leading from the settler to the grainer, and the grainer D, having submerged steam-pipes $h$, perforated air-pipes $k$, and air-supply pipes $m$ $n$ $p$, the whole constructed and arranged to operate in the manner and for the purpose set forth.

W. W. ELMER.

Witnesses:
H. S. SPRAGUE,
CHARLES J. HUNT.